US012681927B2

(12) United States Patent
Geng et al.

(10) Patent No.: US 12,681,927 B2
(45) Date of Patent: Jul. 14, 2026

(54) LARGE LANGUAGE MODEL-BASED QUESTION PROCESSING METHOD AND APPARATUS, ELECTRONIC DEVICE, AND STORAGE MEDIUM

(71) Applicant: Beijing Baidu Netcom Science Technology Co., Ltd., Beijing (CN)

(72) Inventors: Shaozhen Geng, Beijing (CN); Jun Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/749,211

(22) Filed: Jun. 20, 2024

(65) Prior Publication Data

US 2025/0156411 A1 May 15, 2025

(30) Foreign Application Priority Data

Nov. 13, 2023 (CN) ......................... 202311507867.1

(51) Int. Cl.

| | |
|---|---|
| ***G06F 16/00*** | (2019.01) |
| ***G06F 16/245*** | (2019.01) |
| ***G06F 16/25*** | (2019.01) |
| ***G06F 40/205*** | (2020.01) |
| ***G06F 40/40*** | (2020.01) |

(52) U.S. Cl.

CPC .......... *G06F 16/245* (2019.01); *G06F 16/258* (2019.01); *G06F 40/205* (2020.01); *G06F 40/40* (2020.01)

(58) Field of Classification Search

None

See application file for complete search history.

(56) References Cited

U.S. PATENT DOCUMENTS

| | | | | |
|---|---|---|---|---|
| 11,182,695 | B1 * | 11/2021 | Kirsche | G06N 20/00 |
| 11,232,365 | B2 * | 1/2022 | Sundararaman | G06F 40/284 |
| 11,361,161 | B2 * | 6/2022 | Beaver | A61K 38/1841 |
| 2020/0050949 | A1 * | 2/2020 | Sundararaman | G06F 40/284 |

(Continued)

FOREIGN PATENT DOCUMENTS

| | | | | |
|---|---|---|---|---|
| CN | 108519965 A | * | 9/2018 | G06F 40/131 |
| CN | 108762885 A | | 11/2018 | |

(Continued)

OTHER PUBLICATIONS

Aug. 24, 2024—(CN) First Office Action—App. No. 202311507867.1 w/ English translation.

(Continued)

*Primary Examiner* — Jean M Corrielus

(74) *Attorney, Agent, or Firm* — Banner & Witcoff, Ltd.

(57) ABSTRACT

Provided are a query processing method based on a large language model, an electronic device, and a storage medium. The query processing method based on a large language model includes acquiring a to-be-processed target query; generating a prompt based on a to-be-used target data model, target format information of a specified data format, and the target query; inputting the prompt into the large language model to obtain a target parsing result of the specified data format outputted by the large language model; and modifying the target parsing result based on the target data model.

20 Claims, 6 Drawing Sheets

(56) References Cited

U.S. PATENT DOCUMENTS

| | | | | |
|---|---|---|---|---|
| 2020/0125798 | A1* | 4/2020 | Beaver | A61K 38/1841 |
| 2021/0191962 | A1 | 6/2021 | Qu et al. | |
| 2021/0342379 | A1* | 11/2021 | Zhang | G06F 40/211 |
| 2022/0378874 | A1* | 12/2022 | Beaver | A61K 31/198 |
| 2023/0004774 | A1* | 1/2023 | Li | G06N 3/08 |

FOREIGN PATENT DOCUMENTS

| | | | | | |
|---|---|---|---|---|---|
| CN | 110738997 | A | | 1/2020 | |
| CN | 111625635 | A | * | 9/2020 | G06N 3/045 |
| CN | 114064709 | A | * | 2/2022 | G06F 16/2455 |
| CN | 114168720 | A | * | 3/2022 | G06N 20/00 |
| CN | 114281957 | A | * | 4/2022 | |
| CN | 116383234 | A | | 7/2023 | |
| CN | 116467500 | A | * | 7/2023 | G06F 16/9032 |
| CN | 116777113 | A | * | 9/2023 | G05B 19/4097 |

OTHER PUBLICATIONS

Aug. 23, 2024—(CN) First Search Report—App. No. 202311507867.1 w/ English translation.

* cited by examiner

S101

Acquire a to-be-processed target query

S102

Generate a prompt based on a to-be-used target data model, target format information of a specified data format, and the target query

S103

Input the prompt into the large language model to obtain a target parsing result of the specified data format outputted by the large language model

S104

Modify the target parsing result based on the target data model

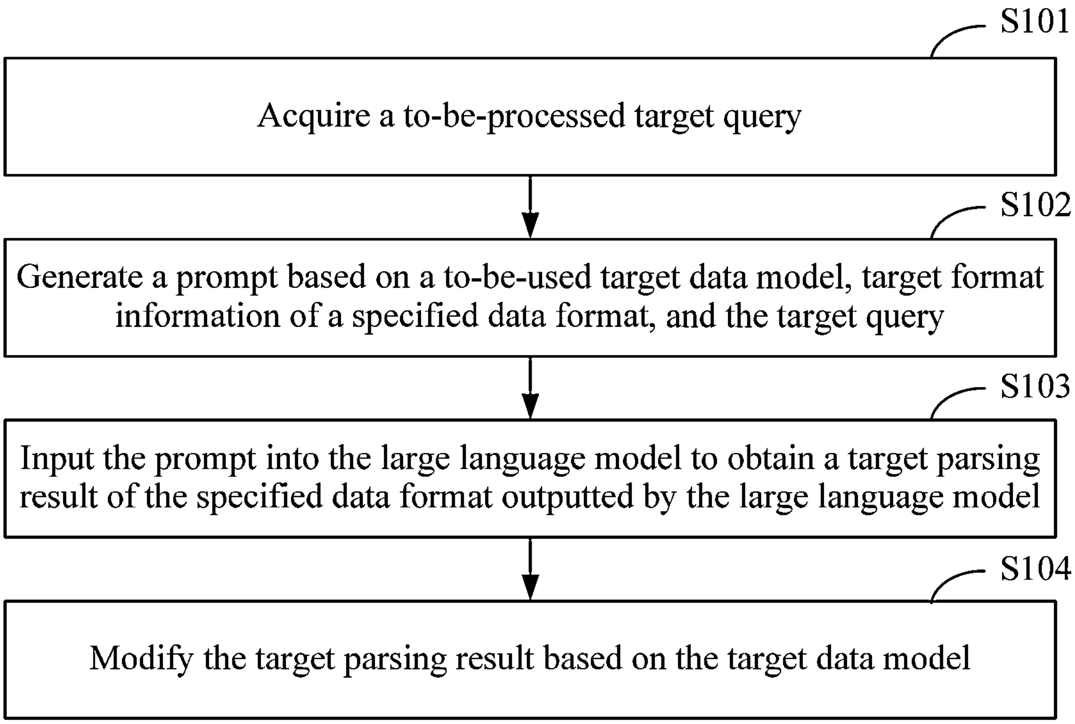

Acquire a to-be-processed target query

S202

Generate a prompt based on a to-be-used target data model, target format information of a specified data format, and the target query

S203

Input the prompt into the large language model to obtain a target parsing result of the specified data format outputted by the large language model

S204

For a filtering condition in the target parsing result, determine a field type of a to-be-filtered field

S205

In response to the to-be-filtered field being of a character type, acquire a filtering value of the to-be-filtered field from the filtering condition

S206

Match the filtering value of the to-be-filtered field with field values of data fields in the target data model and modify the to-be-filtered field according to a matching result

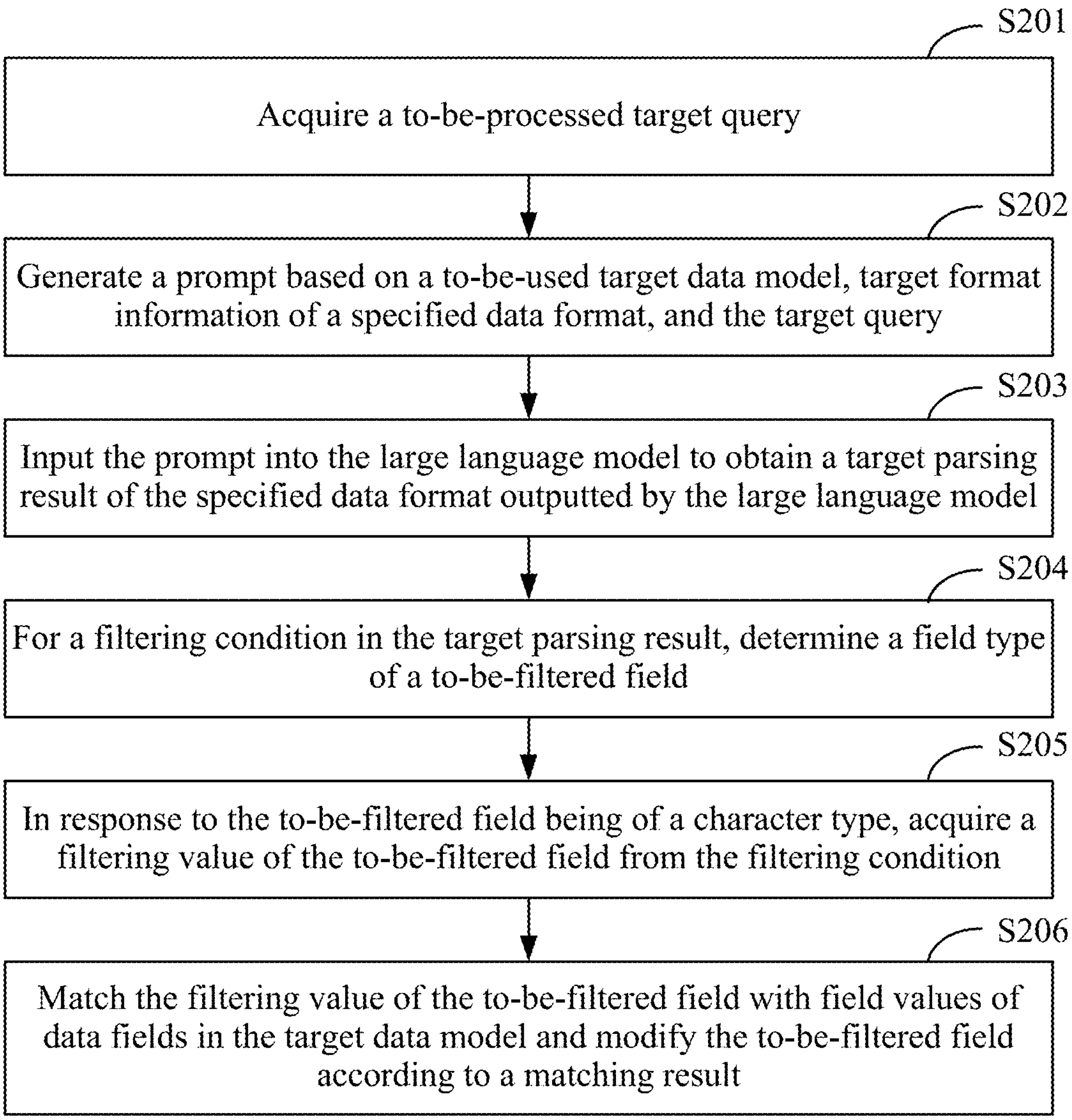

Acquire a to-be-processed target query

S302

Generate a prompt based on a to-be-used target data model, target format information of a specified data format, and the target query

S303

Input the prompt into the large language model to obtain a target parsing result of the specified data format outputted by the large language model

S304

For a filtering condition in the target parsing result, determine a field type of a to-be-filtered field

S305

In response to the to-be-filtered field being of a character type, acquire a filtering value of the to-be-filtered field from the filtering condition

S306

In response to the to-be-filtered field belonging to the data fields, acquire a field value of the to-be-filtered field from the target data model

S307

Match the filtering value of the to-be-filtered field with the field value of the to-be-filtered field to obtain a first matching result

S308

In response to the first matching result being a matching failure, match the filtering value of the to-be-filtered field with a field value of another data field in the target data model to obtain a second matching result

S309

In response to the second matching result being a matching success, modify the to-be-filtered field to the another data field successfully matched

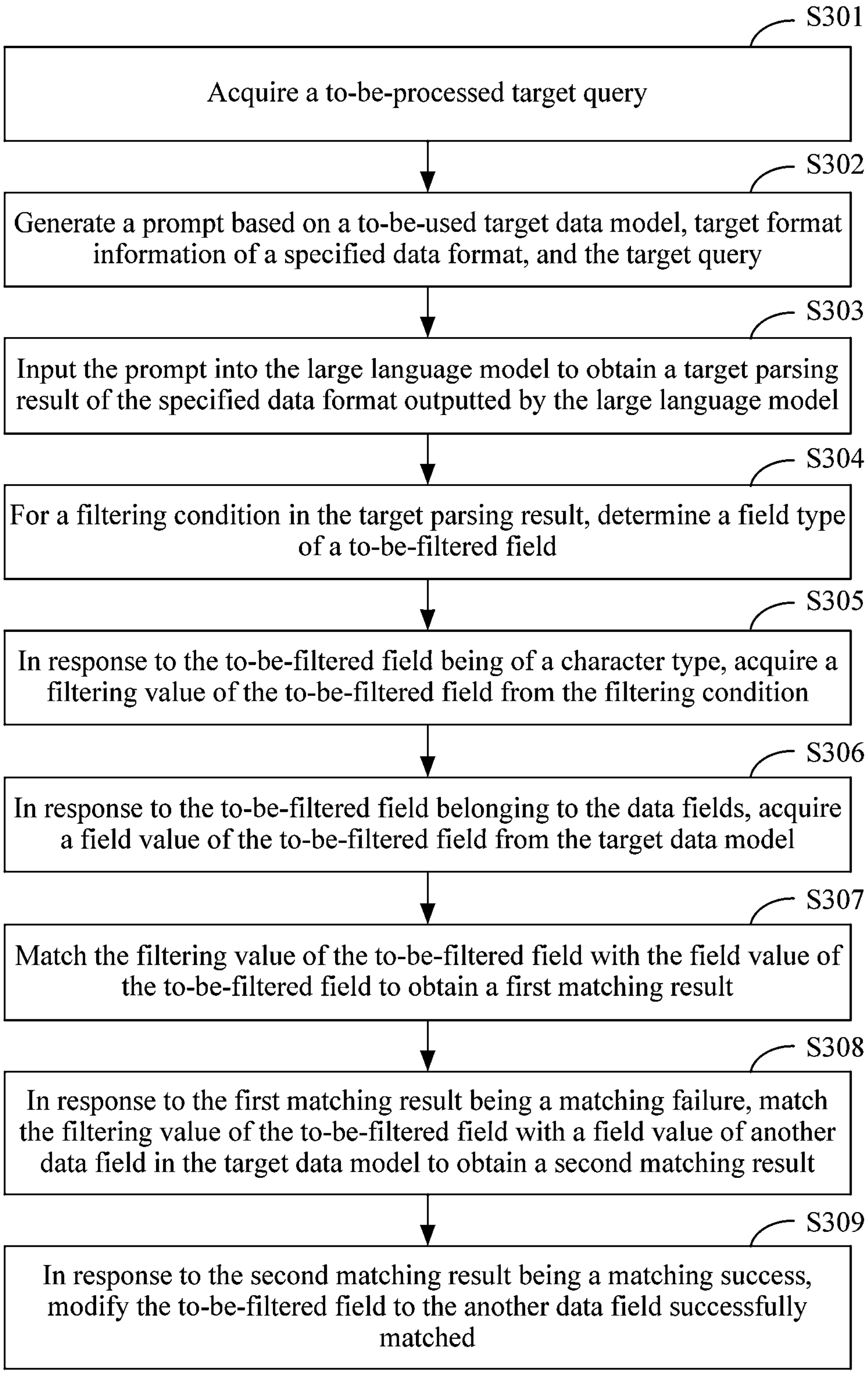

FIG. 3A

LARGE LANGUAGE MODEL-BASED QUESTION PROCESSING METHOD AND APPARATUS, ELECTRONIC DEVICE, AND STORAGE MEDIUM

CROSS-REFERENCE TO RELATED APPLICATION(S)

This application claims priority to Chinese Patent Application No. 202311507867.1 filed with the China National Intellectual Property Administration (CNIPA) on Nov. 13, 2023, the disclosure of which is incorporated herein by reference in its entirety.

TECHNICAL FIELD

The present disclosure relates to the field of artificial intelligence such as deep learning and natural language processing, for example, a query processing method based on a large language model, an electronic device, and a storage medium.

BACKGROUND

A large language model (LLM) is a generative language model characterized by its large size, featuring a vast number of parameters and extensive training data. By utilizing more parameters and larger datasets for training, the performance and sample efficiency of an LLM in various downstream tasks are effectively enhanced.

However, results returned by an LLM exhibit divergence and uncertainty, unable to satisfy the requirements in certain scenarios.

SUMMARY

The present disclosure provides a query processing method based on a large language model, an electronic device, and a storage medium.

According to an aspect of the present disclosure, a query processing method based on a large language model is provided. The method includes acquiring a to-be-processed target query: generating a prompt based on a to-be-used target data model, target format information of a specified data format, and the target query: inputting the prompt into the large language model to obtain a target parsing result of the specified data format outputted by the large language model: and modifying the target parsing result based on the target data model.

According to another aspect of the present disclosure, an electronic device is provided. The electronic device includes at least one processor and a memory communicatively connected to the at least one processor.

The memory stores instructions executable by the at least one processor to enable the at least one processor to perform the method of any embodiment of the present disclosure.

According to another aspect of the present disclosure, a non-transitory computer-readable storage medium is provided. The storage medium stores computer instructions for causing a computer to perform the method of any embodiment of the present disclosure.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the technical solutions and not to limit the present disclosure.

FIG. 1 is a flowchart of a query processing method based on a large language model according to an embodiment of the present disclosure.

FIG. 2 is another flowchart of a query processing method based on a large language model according to an embodiment of the present disclosure.

FIG. 3A is another flowchart of a query processing method based on a large language model according to an embodiment of the present disclosure.

DETAILED DESCRIPTION

Figure 3B:
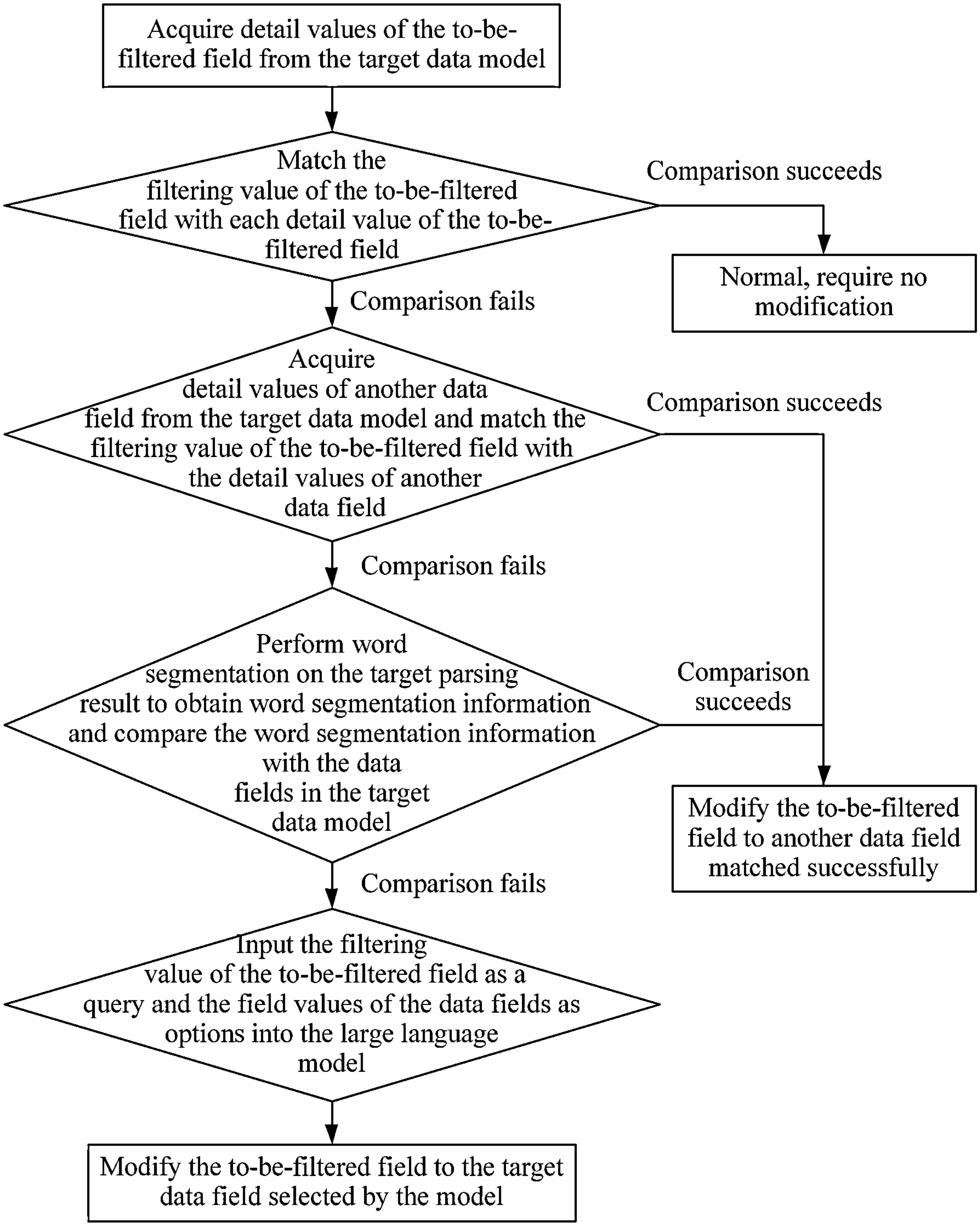
FIG. 3B is a modification diagram of a character-type to-be-filtered field according to an embodiment of the present disclosure.

FIG. 1 is a flowchart of a query processing method based on a large language model according to an embodiment of the present disclosure. The method is applicable to the case where a target parsing result generated for a target query by the large language model is modified based on a target data model. The method can be executed by a query processing apparatus based on a large language model. The apparatus can be implemented by software and/or hardware and can be integrated into an electronic device. As shown in FIG. 1, the query processing method based on a large language model according to this embodiment may include the following:

In S101, a to-be-processed target query is acquired.

In S102, a prompt is generated based on a to-be-used target data model, target format information of a specified data format, and the target query.

In S103, the prompt is input into the large language model to obtain a target parsing result of the specified data format outputted by the large language model.

In S104, the target parsing result is modified based on the target data model.

A data field in the target data model may be a dimension or a measure in the target data model. The dimension is used for describing the attribute or the characteristic of data. The dimension is used for grouping, classifying, filtering, and screening data, provides context and classification for data, and typically has discrete values. The measure is an assessment of an operational indicator. The measure is used for evaluating, calculating, and analyzing the numerical indicator or calculation result of data. The measure typically consists of continuous values, has calculability, and can be aggregated, computed, and statistically analyzed. For example, the target data model may include at least one of the following dimensions: order number, order date, region, province, city, product name, product category, product subcategory, customer name, customer type code, shipping date, or mailing method. The target data model may also include at least one of the following measures: quantity, sales amount, cost, or profit. The specified data format may be a fixed serialized format. The target format information of the specified data format is used for describing the specified data format.

The prompt is the input provided for the large language model, and may be a given query, task, or instruction. The prompt is used for guiding a language generation process of a model. The content of the prompt depends on the user need and the task type. The data model is used for describing, organizing, or manipulating data. The data model may be viewed as simplification and abstraction of the real world to describe entities, attributes, and relationships between entities. It is feasible to select preconstructed data tables as the target data model and make the large language model to parse the target query into the specified data format based on the target data model.

The prompt may be constructed based on the data field in the target data model, the target format information, and the target query. By introducing the data field of the target data model into the prompt, the large language model can establish a relationship between the target query and the data field. By introducing the target format information of the specified data format into the prompt, the large language model converts the target query into the specified data format. The target parsing result of the specified data format may be used to query the target data model to obtain an answer to the target query, that is, the target parsing result may be used as a bridge between the large language model and the target data model, thereby facilitating parsing of the target parsing result. Therefore, by using the prompt formed by multiple parts, the large language model understands the meaning of the target query and generates the target parsing result of the specified data format, that is, the large language model parses the target query into a stable specified data format.

filtered field, a filtering value of the to-be-filtered field, and an operator of the to-be-filtered field.

The target format information of the specified data format may include a format description of the specified data format. The format description of the specified data format may include a preset dimension field "dimensions", a preset measure field "measures", and a preset filtering condition "filters". The target query may be matched with the dimension and the measure in the target data model to obtain a target dimension and a target field that are hit by the target query and obtain a filtering condition. The filtering condition may include a to-be-filtered dimension and/or a to-be-filtered measure. The filtering condition may also be referred to as a screening condition. The target format information enables the large language model to learn to parse the target query into the specified data format.

The filtering condition has three elements: a to-be-filtered field, a filtering operator and a filtering value used by the to-be-filtered field. A first subfield, a second subfield, and a third subfield are introduced into the filtering condition. The to-be-filtered field may be placed in the first subfield. The filtering value used by the to-be-filtered field may be placed in the second subfield. The filtering operator may be placed in the third subfield. The format of the filtering condition is as follows: "filters":[{"k":"______","linkType":"______", "v":["______"]}. k, v, and linkType represent the first subfield, the second subfield, and the third subfield respectively. The filtering condition in the specified data format is modeled by using the filtering condition in the preceding array structure. Correspondingly, the style of the target parsing result may be as follows:

{"dimensions":["___"],"measures":["___"],"filters":[{"k":"___","linkType":"___","v":["___"]},
{"k":"___","linkType":"___","v":["___"]}]}.

In an example in which the target query is the sales amount in January this year, the target parsing result may be as follows:

{"dimensions":[ ],"measures":["sales amount"], "filters":[{"k":"order date",
"linkType":"between","v":["2023-01-01","2023-01-31"]}]}.

Target parsing results output by the large language model vary in quality. By modifying the target parsing result based on the data field and the field value (also known as the detail value) of the data field in the target data model, that is, by using the data field in the target data model as the reference to verify and modify the target field in the target parsing result, the quality of the target parsing result can be improved.

The technical solution of this embodiment of the present disclosure involves generating the prompt based on the to-be-used target data model, the target format information of the specified data format, and the target query: makes the large language model establish a relationship between the target query and the target data model, and parse the target query into the target parsing result in the specified data format based on this relationship; and modifies the target parsing result based on the target data model. This approach enhances the quality of parsing the target query.

In one or more embodiments, the target format information includes a dimension field, a measure field, and a filtering condition. The filtering condition includes a to-be- FIG. 2 is another flowchart of a query processing method based on a large language model according to an embodiment of the present disclosure. Referring to FIG. 2, the query processing method based on a large language model according to this embodiment may include the following:

In S201, a to-be-processed target query is acquired.

In S202, a prompt is generated based on a to-be-used target data model, target format information of a specified data format, and the target query.

In S203, the prompt is input into the large language model to obtain a target parsing result of the specified data format outputted by the large language model.

In S204, for a filtering condition in the target parsing result, a field type of a to-be-filtered field is determined.

In S205, in response to the to-be-filtered field being of a character type, a filtering value of the to-be-filtered field is acquired from the filtering condition.

In S206, the filtering value of the to-be-filtered field is matched with field values of data fields in the target data model, and the to-be-filtered field is modified according to a matching result.

For the filtering condition in the target parsing result, the field type of the to-be-filtered field may be determined by using the filtering value of the to-be-filtered field. The field type is a character type, a date type, or a numeric type. The data field in the target data model may be a dimension or a measure. The field value of the data field may be acquired from the target data model. One data field may have multiple field values. Using the field "region" as an example, the corresponding field value may be Northeast, North China, East China, Central China, South China, Northwest, or Southwest.

For a to-be-filtered field of the character type, it is feasible to acquire the filtering value of the to-be-filtered field from the filtering condition, match the filtering value of the to-be-filtered field with the field values of the data fields in the target data model to obtain a matching result, and determine whether the to-be-filtered field is normal according to the matching result. If the to-be-filtered field is normal, no modification is required. If the to-be-filtered field is abnormal, the to-be-filtered field is modified. For example, the to-be-filtered field may be replaced with a modified data field, thereby improving the quality of the target parsing result.

In one or more embodiments, modifying the target parsing result based on the target data model also includes, in response to the to-be-filtered field being of a date type, performing date formatting on the filtering value of the to-be-filtered field to obtain a date-type value; and matching the date-type value with a field value of the to-be-filtered field in the target data model and modifying the to-be-filtered field according to a matching result.

For a to-be-filtered field of the date type, it is feasible to perform the date formatting on the filtering value of the to-be-filtered field by using a standard date format to obtain a date-type value. For example, when the filtering value of the to-be-filtered field is the date 10-10, a year may be added to obtain 2023 Oct. 10 as the date-type value. Each field value of the to-be-filtered field is acquired from the target data model, the date-type value is matched with each field value to obtain a matching result, and the to-be-filtered field is modified according to the matching result. Date formatting is performed on the to-be-filtered field of the date type, thereby improving the subsequent date matching efficiency.

Additionally, a numeric-type field is much less likely to serve as the filtering condition and thus may not be modified. Therefore, a to-be-filtered field of the numeric type may be filtered and not modified. For example, when the to-be-filtered field is a numeric-type dimension such as identifier (ID) or latitude and longitude coordinates or when the to-be-filtered field is a measure, modification may not be performed on the to-be-filtered field.

According to the technical solution of this embodiment of the present disclosure, for the filtering condition in the target parsing result, the field type of the to-be-filtered field is determined according to the filtering value of the to-be-filtered field; the to-be-filtered field is matched with the data fields in the target data model with reference to the field type of the to-be-filtered field; and the to-be-filtered field is modified according to the matching result, thereby improving the quality of the filtering condition in the target parsing result.

In one or more embodiments, modifying the target parsing result based on the target data model includes, for any target dimension in the target parsing result, if the filtering condition uses the target dimension as the to-be-filtered field and the operator is "equal to" or "containing", deleting the target dimension from the target parsing result.

The style of the target parsing result may be as follows:

{"dimensions":["___"],"measures":["___"],"filters":[{"k":"___","linkType":"___","v":["___"]}.

Here the field "dimensions" is configured to store the target dimension hit by the target query in the target data model, and the field "measures" is configured to store the target measure hit by the target query in the target data model. In the filtering condition "filters", k indicates a to-be-filtered field, v indicates a filtering value of the to-be-filtered field, and linkType indicates an operator of the to-be-filtered field.

If the operator linkType of any to-be-filtered field is "equal to" or "containing" and the to-be-filtered field belongs to the target dimension in "dimensions", the to-be-filtered field is deleted from "dimensions" and retained in the filtering condition. The redundant target dimension in the target parsing result is deleted according to the to-be-filtered field, thereby simplifying the target parsing result and improving the efficiency of subsequently querying the target data model by using the target parsing result.

In one or more embodiments, modifying the target parsing result based on the target data model includes, if the to-be-filtered field in the filtering condition is modified to a target data field based on the target data model and the to-be-filtered field belongs to a target dimension or a target measure in the target parsing result, the target dimension or the target measure in the target parsing result is modified to the target data field.

If the to-be-filtered field in the filtering condition is modified to the target data field based on the target data model, and the to-be-filtered field also belongs to the target dimension in "dimensions" or belongs to the target measure in "measures", the target dimension or the target measure is also modified to the target data field. That is, if the to-be-filtered field in the filtering condition is modified and the to-be-filtered field also belongs to the target dimension or the target measure in the target parsing result, the target dimension or the target measure is modified synchronously, thereby improving the quality of the target parsing result, avoiding mismatching between the target dimension or the target measure and the target data model, and improving the modification efficiency of the target parsing result.

In one or more embodiments, modifying the target parsing result based on the target data model includes, in response to to-be-filtered fields in at least two filtering conditions being the same, combining the at least two filtering conditions.

The target parsing result may include one filtering condition or multiple filtering conditions. If to-be-filtered fields in at least two filtering conditions in the target parsing result are the same, the filtering values and operators of the at least two filtering conditions are combined to obtain a new filtering condition. Filtering conditions having the same to-be-filtered field are combined into a new filtering condition, thereby improving the subsequent query efficiency of the target data model based on the filtering condition.

FIG. 3A is another flowchart of a query processing method based on a large language model according to an embodiment of the present disclosure. The method is applicable to modification of a to-be-filtered field of a character type in the filtering condition. Referring to FIG. 3A, the query processing method based on a large language model according to this embodiment may include the following:

In S301, a to-be-processed target query is acquired.

In S302, a prompt is generated based on a to-be-used target data model, target format information of a specified data format, and the target query.

In S303, the prompt is input into the large language model to obtain a target parsing result of the specified data format outputted by the large language model.

In S304, for a filtering condition in the target parsing result, a field type of a to-be-filtered field is determined.

In S305, in response to the to-be-filtered field being of a character type, a filtering value of the to-be-filtered field is acquired from the filtering condition.

In S306, in response to the to-be-filtered field belonging to the data fields, a field value of the to-be-filtered field is acquired from the target data model.

In S307, the filtering value of the to-be-filtered field is matched with the field value of the to-be-filtered field to obtain a first matching result.

In S308, in response to the first matching result being a matching failure, the filtering value of the to-be-filtered field is matched with a field value of another data field in the target data model to obtain a second matching result.

In S309, in response to the second matching result being a matching success, the to-be-filtered field is modified to another data field successfully matched.

For a to-be-filtered field of the character type, the filtering value of the to-be-filtered field is acquired from the filtering condition. In response to the to-be-filtered field belonging to a data field in the target data model, the field value (also known as the detail value) of the data field is acquired from the target data model to serve as the field value of the to-be-filtered field. The filtering value of the to-be-filtered field is matched with each field value of the to-be-filtered field to obtain the first matching result. If the filtering value of the to-be-filtered field is successfully matched with any field value of the to-be-filtered field, that is, the first matching result is the matching success, the to-be-filtered field is normal, and no modification is required. If the filtering value of the to-be-filtered field fails in matching with all field values, the first matching result is the matching failure, the field value of a data field other than the to-be-filtered field is acquired from the target data model, and the filtering value of the to-be-filtered field is matched with the field value of the data field other than the to-be-filtered field to obtain the second matching result. If the filtering value of the to-be-filtered field matches the field value of any other data field, the second matching result is the matching success, and the to-be-filtered field may be modified to the data field other than the to-be-filtered field.

For a to-be-filtered field of the character type, the filtering value of the to-be-filtered field is matched with the field value (detail value) of the to-be-filtered field or the field value of another data field in the target data model; and in response to the matching result that the to-be-filtered field is abnormal, the to-be-filtered field is modified to another data field successfully matched. In this manner, an accurate to-be-filtered field can be obtained, thereby improving the quality of the filtering condition.

In one or more embodiments, modifying the to-be-filtered field according to the matching result also includes, in response to the second matching result being a matching failure, performing word segmentation on the target parsing result to obtain word segmentation information; and matching the word segmentation information with the data field in the target data model and modifying the to-be-filtered field to a data field successfully matched.

If the second matching result is the matching failure, that is, the filtering value of the to-be-filtered field does not match the field value of each data field in the target data model, word segmentation is performed on the target parsing result to obtain word segmentation information, and the word segmentation information is matched with the data fields in the target data model, for example, the word segmentation information is compared with the field values of the data fields in the target data model. If the matching succeeds, the to-be-filtered field is modified to a data field successfully matched. Word segmentation on the target parsing result and matching between the word segmentation information and the data field in the target data model can avoid a matching failure caused by an error generated by the large language model and improve the modification success rate of the to-be-filtered field.

In one or more embodiments, modifying the target parsing result based on the target data model also includes, in response to all data fields in the target data model failing to match with the to-be-filtered field, inputting the filtering value of the to-be-filtered field as a query and the field values of the data fields as options into the large language model to obtain a target data field selected by the large language model and modifying the to-be-filtered field to the target data field.

If the filtering value of the to-be-filtered field, the word segmentation information, and the data field in the target data model all fail in the matching, it is feasible to select a to-be-modified data field for the to-be-filtered field from the target data model by using the large language model and modify the to-be-filtered field to the selected data field, thereby improving the quality of the filtering condition. It is to be noted that if the large language model selects no data field, the to-be-filtered field is removed from the filtering condition by filtration.

Referring to FIG. 3B, for a to-be-filtered field of the character type, the filtering value of the to-be-filtered field is acquired from the filtering condition, and the detail value of the to-be-filtered field is acquired from the target data model. The filtering value of the to-be-filtered field is matched with each detail value of the to-be-filtered field. If the comparison succeeds, the to-be-filtered field is normal and requires no modification. If the comparison fails, the to-be-filtered field is abnormal and requires modification, the detail value of another data field is acquired from the target data model, and the filtering value of the to-be-filtered field is matched with the detail value of another data field. If the filtering value of the to-be-filtered field is successfully matched with the detail value of any other data field, the to-be-filtered field is modified to the another data field.

If the comparison with the detail value of each data field other than the to-be-filtered field fails, word segmentation is performed on the target parsing result to obtain word segmentation information, and the word segmentation information is compared with the data fields in the target data model. If the comparison succeeds, another data field compared successfully is obtained, and the to-be-filtered field is modified to another data field compared successfully. If all comparisons fail, the filtering value of the to-be-filtered field as a query and the field values of the data fields as options are input into the large language model. If the large language model selects a target data field from all data fields, the to-be-filtered field is modified to the selected target data field. In addition, it is to be noted that if the large language model makes no selection, the to-be-filtered field is removed from the filtering condition by filtration.

According to the technical solution of this embodiment of the present disclosure, for a to-be-filtered field of the character type, it is feasible to acquire the filtering value of the to-be-filtered field from the filtering condition, the filtering value of the to-be-filtered field is compared based on the field value of the to-be-filtered field and the field value of another data field in the target data model, and the to-be-filtered field is modified to a data field successfully compared, thereby improving the accuracy of the filtering condition and improving the quality of the target parsing result.

In one or more embodiments, generating the prompt based on the target data model and the target query includes acquiring a data field in the target data model and acquiring the target format information of the specified data format; and constructing the prompt based on the data field in the target data model, the target format information, and the target query. The target parsing result is configured for establishment of a relationship between the target query and the data field in the target data model. The target parsing result is a serialized result.

The specified serialized format may be a specified JavaScript Object Notation (JSON) format. The target parsing result may be a result in the specified JSON format. Thus, the large language model can convert the target query into a result in the specified JSON format based on the data field in the target data model. The operation of converting the target query into a result in the specified serialized format based on the data field in the target data model can be used for querying the target data model to get the answer to the target query so that the target parsing result can serve as a bridge between the large language model and the target data model, thereby facilitating parsing of the target parsing result.

Figure 4:
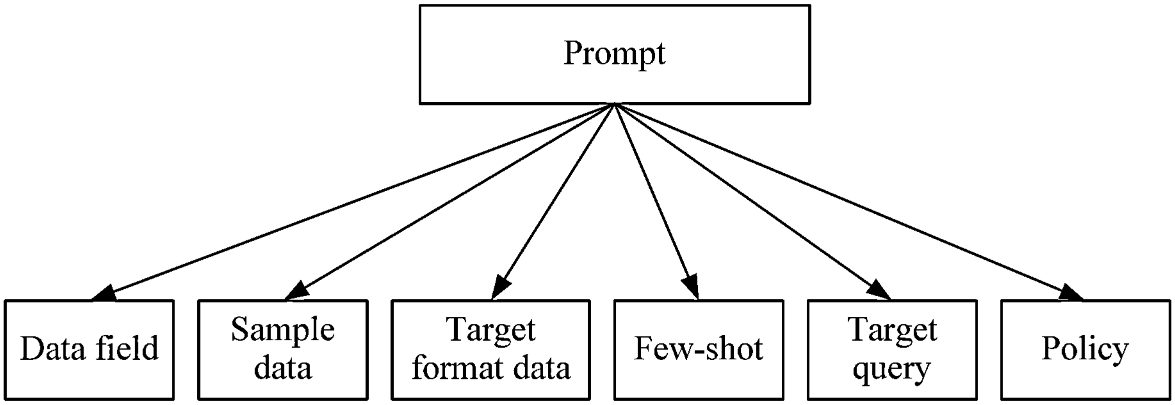
FIG. 4 is a block diagram of a prompt according to an embodiment of the present disclosure.

FIG. 4 is a block diagram of a prompt according to an embodiment of the present disclosure. Referring to FIG. 4, the prompt may include a data field in a target data model, sample data of the data field, target format information, a policy, a few-shot, and a target query.

Referring to FIG. 4, for a data field (field schema information), since the data field is generally stored in the database by using an English name, a mapping between the English name of the data field and the Chinese name of the data field may be obtained by acquiring the field description in the data model layer or giving the data field a Chinese name; and the Chinese name of the data field is used in the prompt for description so that a subsequent query can use the Chinese name.

In the absence of sample data of the data field in the prompt, if the query [what is the sales amount in Shanghai] is asked, the large language model may incorrectly place Shanghai in the region dimension, causing a parsing error. After sample data of the data field is introduced into the prompt and the large language model is told the name of the data field represented by the sample data, the large language model performs reasoning and learning according to the sample data. For example, when the sales amount in "Shijiazhuang" is asked, the large language model may perform reasoning according to the given sample data and return the "city" dimension, increasing the accuracy of the target parsing result. In addition, if the target query includes the sample data of the data field, the accuracy of the target parsing result can be increased.

The format description of the specified data format in the target format information is used for informing the large language model about the format of output data, from which information the field in the specified data format is required to be acquired, and the composition of the filtering condition. The target format information may also include the style of the specified data format so that the result format returned by the large language model can be fixed, facilitating parsing the target parsing result subsequently.

Regarding the considerations, at least one of the following applies:

A. The large language model is not very sensitive to time description information. The large language model can enhance the ability to learn time description information by adding the current date to the considerations and informing the large language model of some possible time description information and of the need to process the time description information. For example, when a user asks "What was the sales amount in Hebei Province last year?", the large language model is required to parse the time description information "last year" into "2022 Jan. 1 to 2022 Dec. 31" and place the parsing result in the filtering condition.

B. If the sample data in the data dimension is not present in the to-be-processed target query, the sample data is required not to be placed in "filters" of the returned result. By this processing, data not related to the target query can be prevented from being present in the filtering condition.

C. The first subfield in the filtering condition must be strictly the same as the name of the data dimension or data measure in the target data model. For example, for the target query "What is the sales amount in Hebei", if the target data model does not have the field "sales amount" and has the field "amount", description is added here to express that it is expected to look for, by reasoning at the time of return, similar data dimension or data measure and use the similar data dimension or data measure as the first subfield in the filtering condition.

D. The data content summarized in the target query is required to be converted into an array. For example, for the target query "Which products have a sales amount greater than 10,000?", the large language model may return 10 thousand as the value of the filtering condition. However, what is required is the numerical value 10,000. Therefore, this should be described in the considerations.

Regarding a small sample, the dimension and the measure in the sample answer of the small sample may be randomly acquired from the target data model and are not fixed. The details are as follows:

A. Regarding a date-type small sample, in the case where the dimension field in the target data model has a date field and a date time type field, a date-type small sample may be added. The corresponding small sample may be as follows:

Query: sales amount in January this year
Answer: {"dimensions":[ ],"measures":["sales amount"],"filters":[{"k":"order date","linkType":"between","v":["2023-01-01","2023-01-31"]}]}.

B. Regarding a geographic-location-type small sample, if the geographic-location-type data dimension is present in the target data model, a geographic-location-type small sample may be added. The corresponding small sample may be as follows:

Query: Show me the sales amount in the province of Shanghai.
Answer: {"dimensions":["province"],"measures":["sales amount"],"filters":[{"k":"province","linkType":"=","v":"Shanghai"}]}.

C. The filtering condition is not a field that must be returned. If no filtering condition is available, only dimension and measure are returned. The corresponding small sample may be as follows:

Query: sales amount in each city
Answer: {"dimensions":["city"],"measures":["sales amount"]}.

Two of the preceding three small samples contain the filtering condition, thereby increasing the learning weight of the filtering condition.

The constructed prompt is input into the large language model to obtain a target parsing result in the specified data format outputted by the large language model. The target dimension, target measure, and the to-be-filtered field in the filtering condition in the target parsing result are verified and modified based on the data field in the target data model to obtain the modified target parsing result. Regarding the filtering condition in the target parsing result, it is feasible to construct a query statement for the filtering condition according to the target dimension and the target measure, query the target data model by using the query statement to obtain the corresponding query result data, and return the query result data to the front end so as to be visualized.

Figure 5:
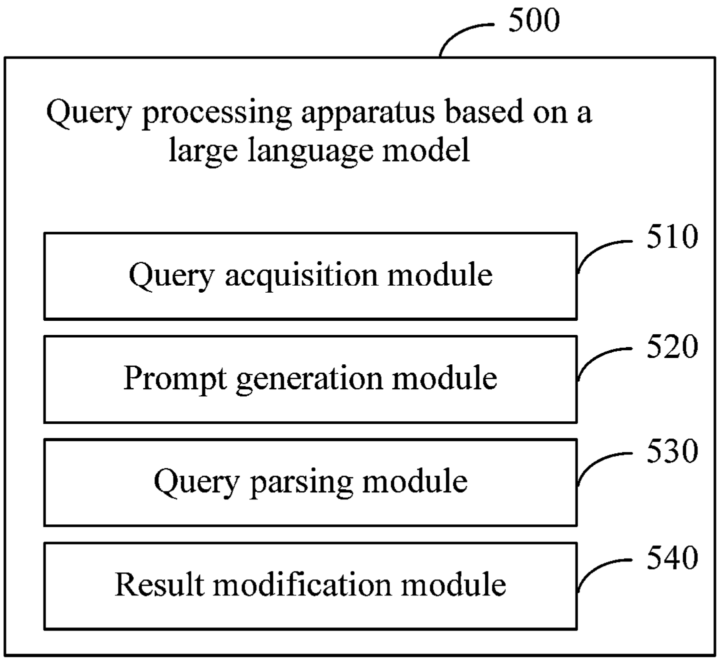
FIG. 5 is a block diagram of a query processing apparatus based on a large language model according to an embodiment of the present disclosure.

FIG. 5 is a block diagram of a query processing apparatus based on a large language model according to an embodiment of the present disclosure. This embodiment is applicable to the case where a target parsing result generated for a target query by a large language model is modified based on a target data model. The apparatus may be implemented by software and/or hardware. As shown in FIG. 5, the query processing apparatus 500 based on a large language model according to this embodiment may include a query acquisition module 510, a prompt generation module 520, a query parsing module 530, and a result modification module 540.

The query acquisition module 510 is configured to acquire a to-be-processed target query.

The prompt generation module 520 is configured to generate a prompt based on a to-be-used target data model, target format information of a specified data format, and the target query.

The query parsing module 530 is configured to input the prompt into the large language model to obtain a target parsing result of the specified data format outputted by the large language model.

The result modification module 540 is configured to modify the target parsing result based on the target data model.

In one or more embodiments, the target format information includes a dimension field, a measure field, and a filtering condition. The filtering condition includes a to-be-filtered field, a filtering value of the to-be-filtered field, and an operator of the to-be-filtered field.

In one or more embodiments, the result modification module 540 includes a field type unit, a filtering value unit, and a modification unit.

The field type unit is configured to, for a filtering condition in the target parsing result, determine a field type of a to-be-filtered field.

The filtering value unit is configured to, in response to the to-be-filtered field being of a character type, acquire a filtering value of the to-be-filtered field from the filtering condition.

The modification unit is configured to match the filtering value of the to-be-filtered field with field values of data fields in the target data model and modify the to-be-filtered field according to a matching result.

In one or more embodiments, the modification unit includes a field value subunit, a first matching subunit, a second matching subunit, and a first modification subunit.

The field value subunit is configured to, in a case where the to-be-filtered field belongs to the data fields, acquire a field value of the to-be-filtered field from the target data model.

The first matching subunit is configured to match the filtering value of the to-be-filtered field with the field value of the to-be-filtered field to obtain a first matching result.

The second matching subunit is configured to, in response to the first matching result being a matching failure, match the filtering value of the to-be-filtered field with a field value of another data field in the target data model to obtain a second matching result.

The first modification subunit is configured to, in response to the second matching result being a matching success, modify the to-be-filtered field to the another data field successfully matched.

In one or more embodiments, the modification unit also includes a word segmentation subunit and a second modification subunit.

The word segmentation subunit is configured to, in response to the second matching result being a matching failure, perform word segmentation on the target parsing result to obtain word segmentation information.

The second modification subunit is configured to match the word segmentation information with the data fields in the target data model and modify the to-be-filtered field to a data field successfully matched.

In one or more embodiments, the result modification module 540 also includes a model modification unit.

The model modification unit is configured to, in response to all data fields in the target data model failing to match the to-be-filtered field, input the filtering value of the to-be-filtered field as a query and the field values of the data fields as options into the large language model to obtain a target data field selected by the large language model and modify the to-be-filtered field to the target data field.

In one or more embodiments, the result modification module 530 also includes a date modification unit. The date modification unit includes a date format subunit and a date modification subunit.

The date format subunit is configured to, in response to the to-be-filtered field being of a date type, perform date formatting on the filtering value of the to-be-filtered field to obtain a date-type value.

The date modification subunit is configured to match the date-type value with a field value of the to-be-filtered field in the target data model and modify the to-be-filtered field according to a matching result.

In one or more embodiments, the result modification module 530 is configured to, for any target dimension in the target parsing result, if the filtering condition uses the target dimension as the to-be-filtered field and the operator is "equal to" or "containing", delete the target dimension from the target parsing result.

In one or more embodiments, the result modification module 530 is configured to, in response to modifying the to-be-filtered field in the filtering condition to a target data field based on the target data model and the to-be-filtered field being a target dimension or a target measure in the target parsing result, modify the target dimension or the target measure in the target parsing result to the target data field.

In one or more embodiments, the result modification module 530 is configured to, in response to to-be-filtered fields in at least two filtering conditions being the same, combine the at least two filtering conditions.

In one or more embodiments, the prompt generation module 520 includes a field format unit and a prompt construction unit.

The field format unit is configured to acquire a data field in the target data model and acquire the target format information of the specified data format.

The prompt construction unit is configured to construct the prompt based on the data field in the target data model, the target format information, and the target query.

The target parsing result is configured for establishment of a relationship between the target query and the data field in the target data model, and the target parsing result is a serialized result.

In the technical solutions of embodiments of the present disclosure, a relationship between the target query and the data field in the target data model is established by using the large language model: the target query is parsed into a serialized target parsing result based on the relationship; and the target dimension, the target measure, and the filtering condition in the target parsing result are modified based on the data fields in the target data model, thereby improving the adaptability between the target parsing result and the target data model.

In the technical solutions of the present disclosure, acquisition, storage and application of user personal information involved are in compliance with relevant laws and regulations and do not violate public order and good customs.

According to embodiments of the present disclosure, also provided are an electronic device, a readable storage medium, and a computer program product.

Figure 6:
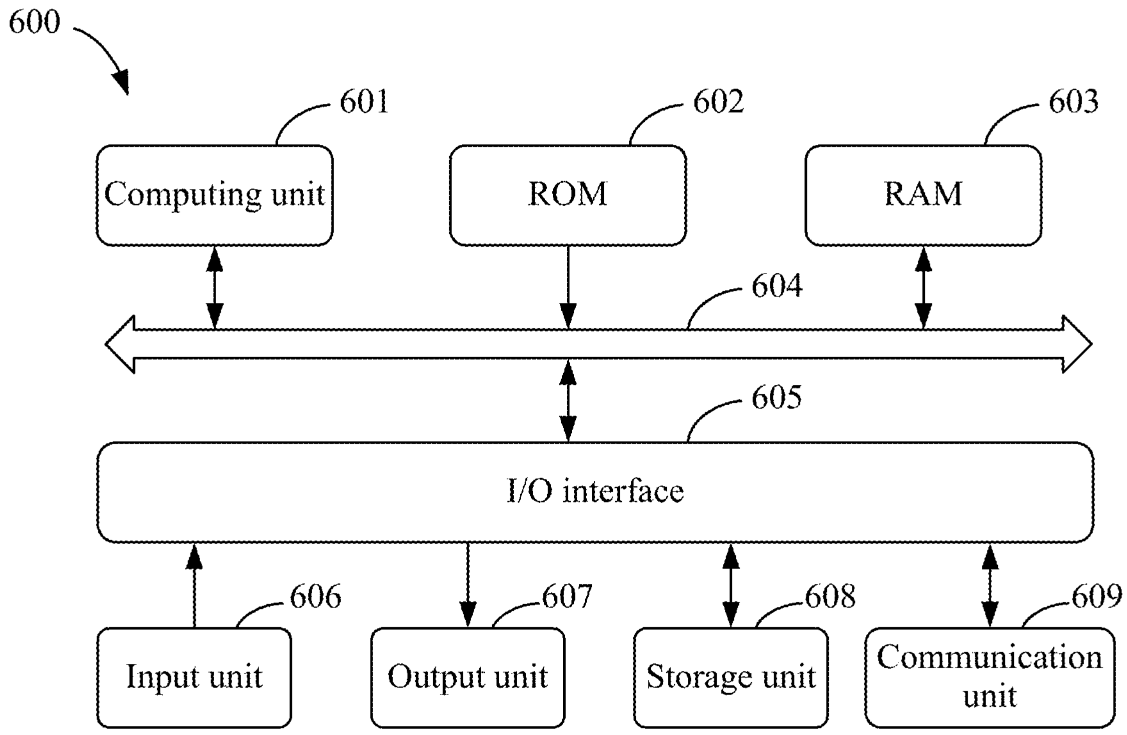
FIG. 6 is a block diagram of an electronic device for implementing a query processing method based on a large language model according to an embodiment of the present disclosure.

FIG. 6 is a block diagram of an electronic device for implementing a query processing method based on a large language model according to an embodiment of the present disclosure.

FIG. 6 is a block diagram of an example electronic device 600 for implementing embodiment of the present disclosure. The electronic device is intended to represent various forms of digital computers, for example, a laptop computer, a desktop computer, a worktable, a personal digital assistant, a server, a blade server, a mainframe computer or another applicable computer. The electronic device may also represent various forms of mobile apparatuses, for example, a personal digital assistant, a cellphone, a smartphone, a wearable device or a similar computing apparatus. Herein the shown components, the connections and relationships between these components and the functions of these components are illustrative only and are not intended to limit the implementation of the present disclosure as described and/or claimed herein.

As shown in FIG. 6, the electronic device 600 includes a computing unit 601. The computing unit 601 may perform various appropriate actions and processing according to a computer program stored in a read-only memory (ROM) 602 or a computer program loaded into a random-access memory (RAM) 603 from a storage unit 608. Various programs and data required for the operation of the electronic device 600 are also stored in the RAM 603. The computing unit 601, the ROM 602 and the RAM 603 are connected to each other through a bus 604. An input/output (I/O) interface 605 is also connected to the bus 604.

Multiple components in the electronic device 600 are connected to the I/O interface 605. The multiple components include an input unit 606 such as a keyboard or a mouse, an output unit 607 such as various types of displays or speakers, the storage unit 608 such as a magnetic disk or an optical disk, and a communication unit 609 such as a network card, a modem or a wireless communication transceiver. The communication unit 609 allows the electronic device 600 to exchange information/data with other devices over a computer network such as the Internet and/or various telecommunications networks.

The computing unit 601 may be various general-purpose and/or special-purpose processing components having processing and computing capabilities. Examples of the computing unit 601 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller and microcontroller. The computing unit 601 executes various methods and processing described above, such as a query processing method based on a large language model. For example, in some embodiments, the query processing method based on a large language model may be implemented as a computer software program tangibly contained in a machine-readable medium such as the storage unit 608. In some embodiments, part or all of computer programs may be loaded and/or installed onto the electronic device 600 via the ROM 602 and/or the communication unit 609. When the computer program is loaded onto the RAM 603 and executed by the computing unit 601, one or more steps of the query processing method based on a large language model may be performed. Alternatively, in other embodiments, the computing unit 601 may be configured, in any other suitable manner (for example, by means of firmware), to perform the query processing method based on a large language model.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The at least one programmable processor may be a special-purpose or general-purpose programmable processor for receiving data and instructions from a memory system, at least one input apparatus and at least one output apparatus and transmitting data and instructions to the memory system, the at least one input apparatus and the at least one output apparatus.

Program codes for implementation of the methods of the present disclosure may be written in one programming language or any combination of multiple programming languages. These program codes may be provided for the processor or controller of a general-purpose computer, a special-purpose computer or another programmable data processing apparatus to cause functions/operations specified in flowcharts and/or block diagrams to be implemented when the program codes are executed by the processor or controller. The program codes may be executed entirely on a machine, partly on a machine, as a stand-alone software package, partly on a machine and partly on a remote machine, or entirely on a remote machine or a server.

In the context of the present disclosure, a machine-readable medium may be a tangible medium that may include or store a program that can be used by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device or any appropriate combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), and the Internet.

A computer system may include clients and servers. A client and a server are generally remote from each other and typically interact through a communication network. The relationship between the clients and the servers arises by virtue of computer programs running on respective computers and having a client-server relationship to each other. A server may be a cloud server, a server of a distributed system, or a server combined with a blockchain.

Artificial intelligence is a discipline studying the simulation of certain human thinking processes and intelligent behaviors (such as learning, reasoning, thinking and planning) by a computer and involves techniques at both hardware and software levels. Hardware techniques of artificial intelligence generally include techniques such as sensors, special-purpose artificial intelligence chips, cloud computing, distributed storage and big data processing. Software techniques of artificial intelligence mainly include several major directions such as computer vision technology, speech recognition technology, natural language processing technology, machine learning/deep learning technology, big data processing technology and knowledge graph technology.

Cloud computing refers to a technical system that accesses a shared elastic-and-scalable physical or virtual resource pool through a network and can deploy and manage resources in an on-demand self-service manner, where the resources may include servers, operating systems, networks, software, applications, storage devices and the like. Cloud computing can provide efficient and powerful data processing capabilities for model training and technical applications such as artificial intelligence and blockchain.

It is to be understood that various forms of the preceding flows may be used with steps reordered, added or removed. For example, the steps described in the present disclosure may be executed in parallel, in sequence, or in a different order as long as the desired results of the technical solutions disclosed in the present disclosure are achieved. The execution sequence of these steps is not limited herein.

The scope of the present disclosure is not limited to the preceding embodiments. It is to be understood by those skilled in the art that various modifications, combinations, sub-combinations and substitutions may be made according to design requirements and other factors. Any modification, equivalent substitution and improvement made within the spirit and principle of the present disclosure is within the scope of the present disclosure.

What is claimed is:

1. A query processing method based on a large language model, being executed by an electronic device having a query processing function and the method comprising:

acquiring a target query;

generating a prompt based on a target data model, target format information of a specified data format, and the target query, wherein the target data model comprises data tables preconstructed based on a data dimension and a data measure, the target format information comprises a dimension field, a measure field, and a filtering condition, wherein the filtering condition comprises a target filter field, a filtering value of the target filter field, and an operator of the target filter field, and wherein the data dimension comprises at least one of an order number, an order date, a region, a province, a city, a product name, a product category, a product subcategory, a customer name, a customer type code, a shipping date, or a mailing method; and the data measure comprises at least one of a quantity, a sales amount, a cost, or a profit;

using the prompt as input of the large language model to query the target data model through the large language model, and obtaining output of the large language model in the specified data format as a target parsing result, wherein the target parsing result is a serialized result;

determining an answer to the target query by modifying the target parsing result based on the target data model; and displaying the answer to the target query through the electronic device;

wherein determining the answer to the target query by modifying the target parsing result based on the target data model comprises:

for a filtering condition in the target parsing result, determining a field type of a target filter field according to a filtering value of the target filter field, matching the target filter field with data fields in the target data model with reference to the field type of the target filter field, modifying the target filter field according to a matching result of the target filter field, and determining the answer to the target query based on the modified target filter field.

2. The query processing method based on the large language model of claim 1, wherein determining the answer to the target query by modifying the target parsing result based on the target data model comprises:

in response to the target filter field being of a character type, acquiring the filtering value of the target filter field from the filtering condition; and matching the filtering value of the target filter field with field values of the data fields in the target data model and modifying the target filter field according to the matching result.

3. The query processing method based on the large language model of claim 2, wherein matching the filtering value of the target filter field with the field values of the data fields in the target data model and modifying the target filter field according to the matching result comprises:

in response to the target filter field belonging to the data fields, acquiring a field value of the target filter field from the target data model;

matching the filtering value of the target filter field with the field value of the target filter field from the target data model to obtain a first matching result;

in response to the first matching result being a matching failure, matching the filtering value of the target filter field with a field value of another data field in the target data model to obtain a second matching result; and in response to the second matching result being a matching success, modifying the target filter field to another data field successfully matched.

4. The query processing method based on the large language model of claim 3, wherein modifying the target filter field according to the matching result further comprises:

in response to the second matching result being a matching failure, performing word segmentation on the target parsing result to obtain word segmentation information; and matching the word segmentation information with the data fields in the target data model and modifying the target filter field to a data field successfully matched.

5. The query processing method based on the large language model of claim 2, wherein determining the answer to the target query by modifying the target parsing result based on the target data model further comprises:

in response to all data fields in the target data model failing to match with the target filter field, inputting the filtering value of the target filter field as a query and the field values of the data fields as options into the large language model to obtain a target data field selected by the large language model and modifying the target filter field to the target data field.

6. The query processing method based on the large language model of claim 2, wherein determining the answer to the target query by modifying the target parsing result based on the target data model further comprises:

in response to the target filter field being of a date type, performing date formatting on the filtering value of the target filter field to obtain a date-type value; and matching the date-type value with a field value of the target filter field in the target data model and modifying the target filter field according to a matching result.

7. The query processing method based on the large language model of claim 1, wherein determining the answer to the target query by modifying the target parsing result based on the target data model comprises:

for a target dimension in the target parsing result, in response to the filtering condition using the target dimension as the target filter field and the operator of the target filter field being "equal to" or "containing", deleting the target dimension from the target parsing result.

8. The query processing method based on the large language model of claim 1, wherein determining the answer to the target query by modifying the target parsing result based on the target data model comprises:

in response to modifying the target filter field in the filtering condition to a target data field based on the target data model and the target filter field being a target dimension or a target measure in the target parsing result, modifying the target dimension or the target measure in the target parsing result to the target data field.

9. The query processing method based on the large language model of claim 1, wherein determining the answer to the target query by modifying the target parsing result based on the target data model comprises:

in response to target filter fields in at least two filtering conditions being the same, combining the at least two filtering conditions.

10. The query processing method based on the large language model of claim 1, wherein generating the prompt based on the target data model and the target query comprises:

acquiring a data field in the target data model and acquiring the target format information of the specified data format; and constructing the prompt based on the data field in the target data model, the target format information, and the target query, wherein the target parsing result is configured for establishment of a relationship between the target query and the data field in the target data model.

11. An electronic device, comprising:

at least one processor; and a memory communicatively connected to the at least one processor, wherein the memory stores instructions executable by the at least one processor, and the instructions are executed by the at least one processor to enable the at least one processor to perform the following:

acquiring a target query;

generating a prompt based on a target data model, target format information of a specified data format, and the target query, wherein the target data model comprises data tables preconstructed based on a data dimension and a data measure, the target format information comprises a dimension field, a measure field, and a filtering condition, wherein the filtering condition comprises a target filter field, a filtering value of the target filter field, and an operator of the target filter field, wherein the data dimension comprises at least one of an order number, an order date, a region, a province, a city, a product name, a product category, a product subcategory, a customer name, a customer type code, a shipping date, or a mailing method; and the data measure comprises at least one of a quantity, a sales amount, a cost, or a profit;

using the prompt as input of a large language model to query the target data model through the large language model, and obtaining output of the large language model in the specified data format as a target parsing result, wherein the target parsing result is a serialized result;

determining an answer to the target query by modifying the target parsing result based on the target data model; and displaying the answer to the target query;

wherein determining the answer to the target query by modifying the target parsing result based on the target data model comprises:

for a filtering condition in the target parsing result, determining a field type of a target filter field according to a filtering value of the target filter field, matching the target filter field with data fields in the target data model with reference to the field type of the target filter field, modifying the target filter field according to a matching result of the target filter field, and determining the answer to the target query based on the modified target filter field.

12. The electronic device of claim 11, wherein the at least one processor is enabled to perform determining the answer to the target query by modifying the target parsing result based on the target data model by:

in response to the target filter field being of a character type, acquiring the filtering value of the target filter field from the filtering condition; and matching the filtering value of the target filter field with field values of the data fields in the target data model and modifying the target filter field according to the matching result.

13. The electronic device of claim 12, wherein the at least one processor is enabled to perform matching the filtering value of the target filter field with the field values of the data fields in the target data model and modifying the target filter field according to the matching result by:

in response to the target filter field belonging to the data fields, acquiring a field value of the target filter field from the target data model;

matching the filtering value of the target filter field with the field value of the target filter field from the target data model to obtain a first matching result;

in response to the first matching result being a matching failure, matching the filtering value of the target filter field with a field value of another data field in the target data model to obtain a second matching result; and in response to the second matching result being a matching success, modifying the target filter field to another data field successfully matched.

14. The electronic device of claim 13, wherein the at least one processor is enabled to perform modifying the target filter field according to the matching result further by:

in response to the second matching result being a matching failure, performing word segmentation on the target parsing result to obtain word segmentation information; and matching the word segmentation information with the data fields in the target data model and modifying the target filter field to a data field successfully matched.

15. The electronic device of claim 12, wherein the at least one processor is enabled to perform determining the answer to the target query by modifying the target parsing result based on the target data model further by:

in response to all data fields in the target data model failing to match with the target filter field, inputting the filtering value of the target filter field as a query and the field values of the data fields as options into the large language model to obtain a target data field selected by the large language model and modifying the target filter field to the target data field.

16. The electronic device of claim 12, wherein the at least one processor is enabled to perform determining the answer to the target query by modifying the target parsing result based on the target data model further by:

in response to the target filter field being of a date type, performing date formatting on the filtering value of the target filter field to obtain a date-type value; and matching the date-type value with a field value of the target filter field in the target data model and modifying the target filter field according to a matching result.

17. The electronic device of claim 11, wherein the at least one processor is enabled to perform determining the answer to the target query by modifying the target parsing result based on the target data model by:

for a target dimension in the target parsing result, in response to the filtering condition using the target dimension as the target filter field and the operator of the target filter field being "equal to" or "containing", deleting the target dimension from the target parsing result.

18. The electronic device of claim 11, wherein the at least one processor is enabled to perform determining the answer to the target query by modifying the target parsing result based on the target data model by:

in response to modifying the target filter field in the filtering condition to a target data field based on the target data model and the target filter field being a target dimension or a target measure in the target parsing result, modifying the target dimension or the target measure in the target parsing result to the target data field.

19. The electronic device of claim 11, wherein the at least one processor is enabled to perform determining the answer to the target query by modifying the target parsing result based on the target data model by:

in response to target filter fields in at least two filtering conditions being the same, combining the at least two filtering conditions.

20. A non-transitory computer-readable storage medium storing computer instructions for causing a computer to perform the following:

acquiring a target query;

generating a prompt based on a target data model, target format information of a specified data format, and the target query, wherein the target data model comprises data tables preconstructed based on a data dimension and a data measure, the target format information comprises a dimension field, a measure field, and a filtering condition, wherein the filtering condition comprises a target filter field, a filtering value of the target filter field, and an operator of the target filter field, and wherein the data dimension comprises at least one of an order number, an order date, a region, a province, a city, a product name, a product category, a product subcategory, a customer name, a customer type code, a shipping date, or a mailing method; and the data measure comprises at least one of a quantity, a sales amount, a cost, or a profit;

using the prompt as input of a large language model to query the target data model through the large language model, and obtaining output of the large language model in the specified data format as a target parsing result, wherein the target parsing result is a serialized result;

determining an answer to the target query by modifying the target parsing result based on the target data model; and displaying the answer to the target query through an electronic device;

wherein determining the answer to the target query by modifying the target parsing result based on the target data model comprises:

for a filtering condition in the target parsing result, determining a field type of a target filter field according to a filtering value of the target filter field, matching the target filter field with data fields in the target data model with reference to the field type of the target filter field, modifying the target filter field according to a matching result of the target filter field, and determining the answer to the target query based on the modified target filter field.

* * * * *